United States Patent
Corcoran et al.

(10) Patent No.: US 10,165,838 B2
(45) Date of Patent: Jan. 1, 2019

(54) PROTECTIVE COVER FOR A MOBILE DISPLAY DEVICE

(71) Applicant: Logitech Europe S.A., Lausanne (CH)

(72) Inventors: Fergal Corcoran, County Cork (IE); Padraig Murphy, County Cork (IE); Ken Delaney, County Cork (IE); Nick Jinkinson, St-Sulpice (CH); Eric Lu, Hsinchu (TW); Stephen Harvey, County Cork (IE); Jerry Ahern, Ballincollig Cork (IE); Pierce Brady, County Cork (IE); Kevin Hughes, County Stoke Hammond (GB); Ommkar Gulavani, County Solingen (DE); Rade Vignjevic, Oakley (GB)

(73) Assignee: Logitech Europe S.A., Luasanne (CH)

( * ) Notice: Subject to any disclaimer, the term of this patent is extended or adjusted under 35 U.S.C. 154(b) by 438 days.

(21) Appl. No.: 14/744,954

(22) Filed: Jun. 19, 2015

(65) Prior Publication Data

US 2016/0192751 A1 Jul. 7, 2016

Related U.S. Application Data

(60) Provisional application No. 62/099,564, filed on Jan. 4, 2015.

(51) Int. Cl.
*A45C 11/00* (2006.01)
*H04B 1/3888* (2015.01)
(Continued)

(52) U.S. Cl.
CPC .............. *A45C 11/00* (2013.01); *A45F 5/00* (2013.01); *G06F 1/1626* (2013.01);
(Continued)

(58) Field of Classification Search
CPC ........ A45C 2011/003; A45C 2011/002; A45C 11/00; A45C 13/002; A45C 2013/025;
(Continued)

(56) References Cited

U.S. PATENT DOCUMENTS 6,659,274 B2 * 12/2003 Enners ................. G06F 1/1626
206/305
D714,295 S * 9/2014 Fujioka ....................... D14/440
(Continued)

*Primary Examiner* — Robert Poon
(74) *Attorney, Agent, or Firm* — Kilpatricktownsend & Stockton LLP

(57) ABSTRACT

Some embodiments include a protective cover for a mobile display device including a housing, a backplane, a liner, and a lip. The housing includes an outer portion and an inner portion, where the outer portion of the housing has a rectangular frame structure to provide a protective shell along an outer edge of the mobile display device, and where the inner portion receives and secures the mobile display device. The backplane is comprised of a rigid material and is coupled to a backside of the housing and provides a protective shell along a back side of the mobile display device. The liner has a corrugated soft rubber or polymer construction including a successive pattern of protrusions separated by a distance and is coupled to the inner portion of the housing. The lip is coupled to a front side of the housing to retain the mobile display device within the housing.

20 Claims, 13 Drawing Sheets

(51) Int. Cl.
  *A45F 5/00* (2006.01)
  *G06F 1/16* (2006.01)
(52) U.S. Cl.
  CPC ...... *H04B 1/3888* (2013.01); *A45C 2011/002* (2013.01); *A45C 2011/003* (2013.01); *G06F 2200/1633* (2013.01)
(58) Field of Classification Search
  CPC ...... A45C 2013/026; H05K 5/03; H05K 5/02; B65D 81/05
  USPC ........................................................ 206/320
  See application file for complete search history.

(56) References Cited

U.S. PATENT DOCUMENTS

| | | | |
|---|---|---|---|
| 9,238,540 B2* | 1/2016 | Wyner | B65D 81/1275 |
| 2005/0139498 A1* | 6/2005 | Goros | H04B 1/3888 |
| | | | 206/320 |
| 2011/0090622 A1* | 4/2011 | Wang | H05K 5/02 |
| | | | 361/679.01 |
| 2014/0049142 A1* | 2/2014 | Magness | H05K 5/02 |
| | | | 312/223.1 |
| 2014/0152890 A1* | 6/2014 | Rayner | G06F 1/1626 |
| | | | 348/376 |
| 2015/0119118 A1* | 4/2015 | Ashley | H04M 1/04 |
| | | | 455/575.8 |
| 2015/0295617 A1* | 10/2015 | Lai | H04B 1/3888 |
| | | | 455/575.8 |
| 2016/0198823 A1* | 7/2016 | Bergreen | A45C 11/00 |
| | | | 224/241 |

\* cited by examiner

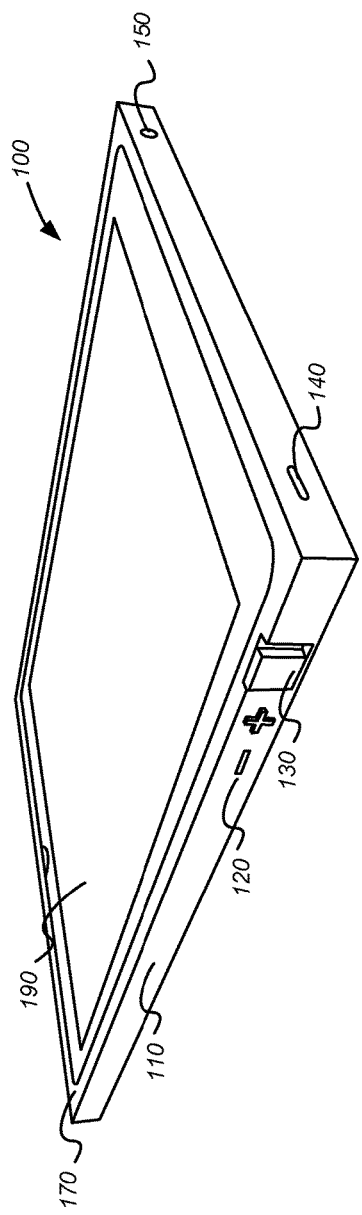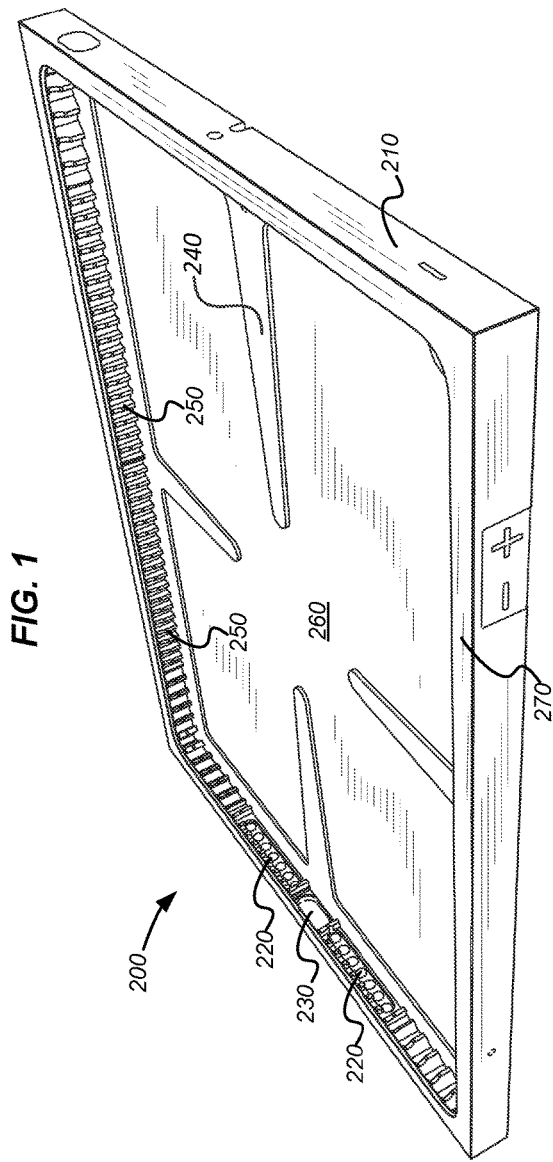

PROTECTIVE COVER FOR A MOBILE DISPLAY DEVICE

CROSS REFERENCE TO RELATED APPLICATIONS

The present application claims the benefit of U.S. Provisional Application No. 62/099,564, filed Jan. 4, 2015, which is hereby incorporated by reference in its entirety for all purposes.

FIELD

Embodiments of the invention generally relate to an accessory for an electronic device. More specifically, certain embodiments are directed to a protective cover for a mobile display device.

BACKGROUND

Modern tablet computers, smart phones, and other electronic devices provide users with the convenience of mobility and an ever increasing computing power with each successive generation. Despite the remarkable improvements in power, size, and speed, there has been little progress in improving robustness. As a result, shattered screens are commonplace and can occur with drops of only a few feet. Repairs can be very expensive and, in some cases, cost prohibitive given the relative cost of the device itself. As such, there has been significant development in protective devices to prevent damage from drops, spills, and the like.

Protective covers can prevent the most common types of damage to mobile devices. Some feature thick rubberized edges and bulky enclosures that meet military specifications. These protective covers tend to be heavy and extremely bulky. In fact, public sentiment tends to believe that there is a direct relationship between bulkiness and increased protection. This conclusion is understandable given the myriad designs and configurations in the marketplace that support this assumption. However, some users prefer sleeker designs that do not significantly change the form factor (e.g., thickness) or add too much weight. These designs typically provide less protection and breakage can still occur with drops from greater heights. Better, sleeker designs are needed that provide excellent protection but do not sacrifice in form factor or weight.

BRIEF SUMMARY

Certain embodiments of the invention include a protective cover for a mobile display device including a housing, a backplane, a liner, and a lip. The housing includes an outer portion and an inner portion, where the outer portion of the housing has a rectangular frame structure to provide a protective shell along an outer edge of the mobile display device, and where the inner portion receives and secures the mobile display device. The backplane is coupled to a backside of the housing to provide a protective shell along the back side of the mobile display device. The backplane can be comprised of a rigid material and is coupled to a backside of the housing and provides a protective shell along a back side of the mobile display device. The liner has a corrugated soft rubber or polymer construction including a successive pattern of protrusions separated by a distance and is coupled to the inner portion of the housing. The lip is coupled to a front side of the housing to retain the mobile display device within the housing. In some cases, the protrusions contact the mobile display device when the input device is disposed in the housing of the protective cover. The distance between the protrusions is typically large enough to allow one or more adjacent protrusions to collapse into regions that are not contacting the mobile display device. The lip coupled to a front side of the housing to retain the mobile display device within the housing. Some embodiments include a liner with succession of protrusions and voids, where the voids are between each protrusion and are substantially the same width as the protrusions, according to certain embodiments of the invention.

In some embodiments, the backplane is a rigid material and operates to bypass and absorb an impact force on the housing. The backplane can be comprised of one of an aluminum or polycarbonate (PC) structure. In some cases, the outer portion of the housing has squared corners to maximize the stopping distance in a corner drop scenario. The liner can be comprised of a soft thermo-plastic elastomer (TPE) or other suitable compound. The lip and housing can be comprised of a stiff TPE, or other suitable material. The liner may protrude from the inner portion of the housing at a direction normal to the inner housing. The liner may include an edge portion and a corner portion, where the edge portion protrudes from the inner portion of the housing at a different angle than the corner portion. In some instances, the edge portion protrudes at a 90 degree angle from the inner portion of the housing, and the corner portion protrudes at a 45 degree angle from the inner portion of the housing. The edge portion may extend at least one inch along adjacent edges of each corner, although the edge portion may extend less than one inch along adjacent edges of each corner as well.

The liner may be formed of a soft thermos-plastic elastomer (TPE). The lip may be formed of a stiff TPE. The backplane may be between 1 and 2 mm thick, although other thickness are envisioned in other embodiments herein. The housing may be 1 mm thick, although other thickness are envisioned in other embodiments herein. The distance between the liner protrusions may be substantially equal to the width of the liner protrusions.

In further embodiments, an apparatus includes a rectangular housing configured to receive a mobile display device, a backplane coupled to a backside of the housing, a liner coupled to the inner portion of the housing, and a lip coupled to a front side of the housing. The backside, housing, and lip operate to retain the mobile display device within the housing. The housing can have an outer portion and an inner portion, where the outer portion of the housing has a rectangular frame structure with squared corners. The backplane can be coupled to a backside of the housing. The liner can be coupled to the inner portion of the housing. The liner can be a soft rubber, soft polymer, or other suitable material. The liner may further be corrugated and can include a successive pattern of protrusions separated by a distance.

In some embodiments, the backplane is a rigid material and operates to bypass and absorb an impact force directed to the housing. The backplane can include aluminum, a polycarbonate (PC), or other suitable material. In a specific embodiment, the liner is comprised of a soft thermo-plastic elastomer (TPE). The lip and housing can be comprised of a stiff TPE or other suitable compound. In some cases, the backplane is approximately 2 mm thick and the housing is approximately 1 mm thick. The distance between the liner protrusions can be substantially equal to the width of the liner protrusions.

In certain embodiments, an apparatus includes a rectangular housing configured to receive a mobile display device. The housing may have an edge, an outer portion, an inner portion, and a lip. The apparatus may also include a backplane coupled to a backside of the housing, where the lip extends in a direction parallel to the backplane and away from the edge of the housing. Two adjacent corners of the lip may extend further away from the edge of the housing than other portions of the lip. The apparatus may further include a liner coupled to the inner portion of the housing.

BRIEF DESCRIPTION OF THE DRAWINGS

FIG. 1 is a simplified illustration of a mobile display device disposed in a protective cover, according to certain embodiments of the present invention.

FIG. 2 is a simplified illustration of a protective cover for a mobile display device, according to certain embodiments of the present invention.

DETAILED DESCRIPTION

Figure 3:
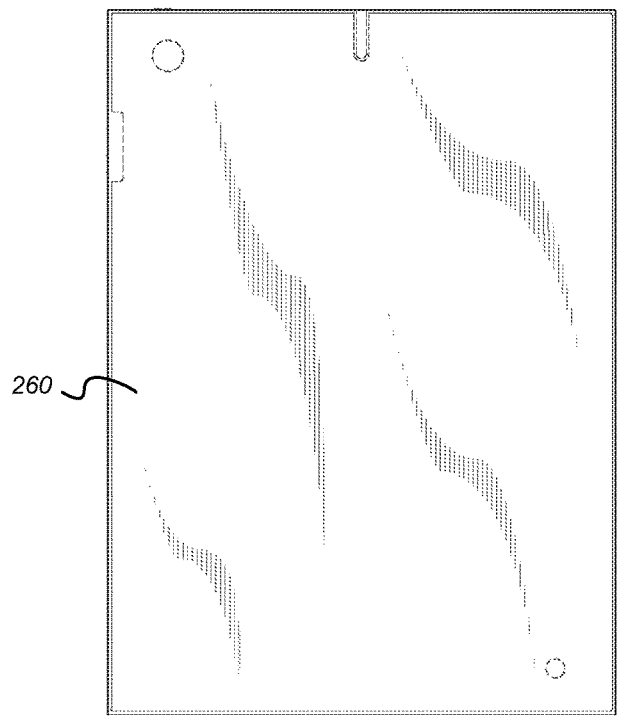
FIG. 3 is a simplified illustration depicting a backplane for a protective cover, according to certain embodiments of the invention.

Embodiments of the invention generally relate to an accessory for an electronic device. More specifically, certain embodiments are directed to a protective cover for a mobile display device.

Protective covers can prevent the most common types of damage to mobile devices. Some feature thick rubberized edges and bulky enclosures that meet military specifications. These protective covers tend to be heavy, extremely bulky, and often obstruct the carefully designed aesthetics of the mobile device itself. However, public sentiment tends to support the notion that there is a direct relationship between bulkiness and increased protection. This conclusion is understandable given the myriad designs and configurations in the marketplace that support this assumption. However, some users would prefer a sleeker design that does not significantly change the form factor (e.g., thickness) or add too much weight. These designs conventionally provide less protection and breakage can still occur with greater drop heights. Better, sleeker designs are needed that provide excellent protection but do not sacrifice in form factor or weight. Embodiments of invention described herein meet this demand.

Damage and Impact Force

Screen damage and breakage can be attributed to an impact force. Higher impact forces are typically associated with higher drops. Furthermore, impact force can be affected by the size of the impact site. That is, an impact that is distributed over a large surface area (e.g., a drop that lands on the back surface of a mobile device) would yield a smaller impact force per square cm at the site of impact. Conversely, an impact distributed over a small area (e.g., a drop that lands on a corner of the mobile device) would yield a much larger impact force per square cm at the site of impact. Force per square cm may be commonly referred to as "stress" where uniaxial stress is expressed by equation:

$$\sigma = \frac{F}{A}$$

Where F is the force (N) acting on an area A (m²).

Impact force can be mitigated by reducing the negative acceleration (i.e., deceleration) of the mobile device at impact. For example, dropping a mobile device on a paved sidewalk would cause an almost instantaneous stop on impact resulting in an extremely high deceleration rate, which translates to a high impact force. Conversely, dropping a mobile device on down pillow would have a comparably low deceleration rate, which translates to a low impact force. The down pillow provides a medium for a low deceleration rate because it collapses, allowing some travel between the moment of impact and the moment of rest. Embodiments of the invention include protective covers that use a combination of rigid and flexible materials on various features to allow the mobile device to "travel" upon impact, thereby significantly reducing deceleration and ultimately lessening the impact force translated to the mobile device. This results in less breakage. Thus, embodiments of the invention provide an ideal combination of function and aesthetics with a sleeker, slimmer, and more attractive design typically associated with slimmer protective devices, while also providing robust protection typically associated with the more bulky counterparts.

Certain embodiments of the invention include a protective cover for a mobile display device including a housing, a backplane, a liner, and a lip. The housing includes an outer portion and an inner portion, where the outer portion of the housing has a rectangular frame structure to provide a protective shell along an outer edge of the mobile display device, and where the inner portion receives and secures the mobile display device. The backplane is coupled to a backside of the housing to provide a protective shell along the back side of the mobile display device. The backplane can be comprised of a rigid material and is coupled to a backside of the housing and provides a protective shell along a back side of the mobile display device. The liner has a corrugated soft rubber or polymer construction including a successive pattern of protrusions separated by a distance and is coupled to the inner portion of the housing. The lip is coupled to a front side of the housing to retain the mobile display device within the housing. In some cases, the protrusions contact the mobile display device when the input device is disposed in the housing of the protective cover. The distance between the protrusions are typically large enough to allow one or more adjacent protrusions to collapse into regions that are not contacting the mobile display device. The lip coupled to a front side of the housing to retain the mobile display device within the housing. Some embodiments include a liner with succession of protrusions and voids, where the voids are between each protrusion and are substantially the same width as the protrusions, according to certain embodiments of the invention.

Exemplary Embodiments

FIG. 1 is a simplified illustration of a mobile display device disposed in a protective cover 100, according to certain embodiments of the present invention. Protective cover 100 includes a housing 110, a backplane (not shown), a liner (not shown), a lip 170, and a mobile device 190 (e.g., tablet computer) disposed therein. Housing 110 includes a number of features that allow access, provide throughways, or actuate certain controls of mobile device 190. For instance, housing 110 includes volume controls 120, on/off switch 140, rotation lock button 130, a hole for a power cable to pass through (not shown), a hole 150 to allow a cable to connect to a stereo headphone jack, and more.

Housing 110 is typically comprised of a stiff material, such as a thermo-plastic elastomer (TPE) or polycarbonate (PC), and can include squared (i.e., 90 degree) corners. Squared corners can maximize the stopping distance in a corner drop scenario. In embodiments, rounded corners can be implemented instead of squared corners. Rounded corners of the protective cover may extend a distance away from respective corners the mobile display device suitable to provide sufficient protection of the mobile display device. It is to be appreciated that any corner shape can be implemented as long as sufficient protection is provided to corners of the mobile display device. Although a tablet computer is shown in FIG. 1, embodiments can be designed to accommodate any size of mobile device including mobile smart phones, music players, personal digital assistants, navigational devices, tablet computers, mini-tablet computers, "phablet" devices, and the like. It should also be understood that aspects of each and every embodiment in this document described explicitly or otherwise can be mixed and matched as required by design, and implementing these myriad combinations would be appreciated by one of ordinary skill in the art with the benefit of this disclosure.

FIG. 2 is a simplified illustration of a protective cover 200 for a mobile display device, according to certain embodiments of the present invention. Protective cover 200 includes a housing 210 configured to house a mobile display device. Housing 210 has an outer portion and an inner portion. A backplane 260 is coupled to a back side of housing 210, a lip 270 is coupled to a front side of housing 210, and a liner 250 coupled to the inner portion of the housing 210. Some implementations can include additional layers such as a reinforcement brace 240 that can provide additional bracing and support to the mobile device. In other implementations, reinforcement brace 240 may not be included on the backplane 260. Housing 210 includes holes, throughways, and actuators to accommodate various accessories of the mobile display device. For example, FIG. 2 depicts speaker holes 220, power cable throughway 230, and a number of other features (on/off switch, stereo headphone throughway, etc.).

Housing 110 can be implemented in any form, including rectangular, square, circular, and oval shapes, or any suitable polygonal design. Housing 110 is typically comprised of a stiff material, such as a thermo-plastic elastomer (TPE) or polycarbonate (PC), and can include squared (i.e., 90 degree) corners. For instance, a stiff TPE with 80 shore A hardness may be used. Although the housing is stiff, it can flex during an impact event to help minimize the deceleration force applied to the mobile device. Impact events are further discussed below with respect to FIGS. 5-11. Housing 210 may include squared off corners to maximize the stopping distance in a corner drop scenario.

Backplane 260 is typically rigid and operates to bypass an impact load to reduce the impact force imparted on the mobile device during an impact. Backplane 260 can be made of a rigid polycarbonate or metal (e.g., aluminum). Multiple backplanes or layers can be integrated. For example, reinforcement brace 240 may be a flexible layer included for cosmetic reasons and may also serve other structural functions (e.g., increasing the stopping distance in a back drop). In a particular embodiment, backplane 260 is a 2.0 mm thick polycarbonate, although other thicknesses and dimensions are expected.

Liner 250 is coupled to the inner portion of housing 210. In some embodiments, the liner contacts the outer edge surface of the mobile display device. Liner 250 can have a corrugated pattern and may be comprised of a soft and flexible material, such as a soft rubber or polymer. The corrugated pattern includes a successive pattern of protrusions (e.g., ridges) separated by a distance. In some cases, the space between the protrusions can be a void (as shown), or may include a different compound with highly flexible or pliable properties. The succession of protrusions can be symmetrical (e.g., evenly spaced), asymmetrical (e.g., unevenly spaced), or a combination thereof. The protrusions can have even widths or uneven widths that may or may not follow a pattern. The protrusions may be configured to be normal to the inner portion of the housing or normal to the mobile display device. Some implementations may utilize non-normal protrusions (i.e., not 90 degrees from surface of inner portion) in certain areas, as shown in the corners of FIG. 2. Protrusions may have uniform or non-uniform lengths, or a combination thereof. Referring to FIG. 2, the protrusions along the center portion of the sides are substantially uniformly spaced and have a substantially uniform spacing. In contrast, the protrusions on the corners are not uniformly spaced, have different lengths, and are configured in different angles relative to the inner portion of the housing. Similarly, the voids between the protrusions can have any volume as dictated by the shape of the protrusions. Furthermore, the surface of the protrusions that contact the mobile device may be contoured. In FIG. 2, the protrusions have multiple planar surfaces, although they can be straight, rounded, notched, or any combination thereof. In some embodiments, some of the voids and protrusions are symmetrically spaced and have a substantially equal volume, as shown in FIGS. 5-8.

In the event of an impact, the protrusions are loaded and flow into one or more of the adjacent voids. This allows the mobile device to travel a distance, which reduces the deceleration and mitigates the impact force imparted on the mobile device. In some embodiments, the voids between the spaces are typically large enough to accommodate at least one protrusion when bended into the void during an impact event. In some cases, the voids can accommodate two protrusions adjacent to the void or a portion thereof. Liner 250 can be comprised of a soft thermo-plastic elastomer (TPE), rubber, neoprene, or other suitable material with similar flexible properties.

FIG. 3 is a simplified illustration depicting a backplane 260 for a protective cover, according to certain embodiments of the invention. Backplane 260 is typically rigid and operates to bypass an impact load to reduce the impact force imparted on the mobile device during an impact. Backplane 260 can be made of a rigid polycarbonate, metal (e.g., aluminum), or suitable composite. Multiple backplanes or layers can be used, such as the reinforcement brace shown in FIG. 2, to provide additional support and protection, or provide impact buffering between the backplane and the mobile device. This can reduce the impact force imparted on the mobile device. In an exemplary embodiment, backplane 260 is a 2.0 mm thick polycarbonate, although other thicknesses and dimensions may be used and can vary based on the application (e.g., type and dimensions of mobile device).

Additional materials can be coupled to the backplane. For example, fabrics or skins can be coupled to the backplane for certain aesthetic enhancements (e.g., colors, textures, etc.). Furthermore, a backplane can be comprised of one or more pieces and coupled together in any suitable manner, as would be appreciated by one of ordinary skill in the art.

Figure 4:
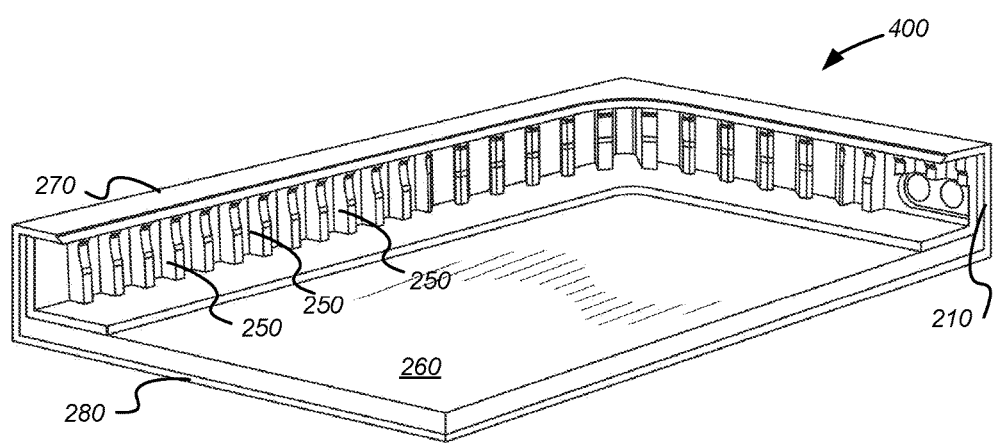
FIG. 4 is a simplified illustration of a cross-section of a protective cover, according to certain embodiments of the invention.

FIG. 4 is a simplified illustration of a cross-section of a protective cover 400, according to certain embodiments of the invention. Protective cover 400 includes a housing 210 configured to house a mobile display device. Housing 210 has an outer portion and an inner portion. A backplane 260 is coupled to a back side of housing 210, a lip 270 is coupled to a front side of housing 210, and a liner 250 coupled to the inner portion of the housing 210. Housing 210 includes holes, throughways, and actuators to accommodate various accessories of the mobile display device.

Liner 250 is coupled to the inner portion of housing 210. In some embodiments, the liner contacts the outer edge surface of the mobile display device. Liner 250 can have a corrugated pattern and may be comprised of a soft and flexible material, such as a soft rubber or polymer. The corrugated pattern includes a successive pattern of protrusions (e.g., ridges) separated by a distance. In some cases, the space between the protrusions can be a void (as shown), or may include a different compound with highly flexible or pliable properties. The succession of protrusions can be symmetrical (e.g., evenly spaced), asymmetrical (e.g., unevenly spaced), or a combination thereof. The protrusions can have even widths or uneven widths that may or may not follow a specific pattern. The protrusions may be configured to be normal to the inner portion of the housing or normal to the mobile display device. Some implementations may utilize non-normal protrusions (i.e., not 90 degrees from surface of inner portion) in certain areas, as shown in the corners of FIG. 4. Protrusions may have uniform or non-uniform lengths, or a combination thereof. Referring to FIG. 4, the protrusions along the center portion of the sides are substantially uniformly spaced and have a substantially uniform spacing. In contrast, the protrusions on the corners are not uniformly spaced, have different lengths, and are configured in different angles relative to the inner portion of the housing. For example, the protrusions in FIG. 4 curve to match the contour of a mobile device. Alternatively, the protrusions shown in FIGS. 5-8 are evenly spaced up to the corners where the last protrusion along each side is connected to one another. Other configurations are possible, as would be appreciated by one of ordinary skill in the art. Similarly, the voids between the protrusions can have any volume as dictated by the shape of the protrusions. Furthermore, the surface of the protrusions that contact the mobile device may be contoured. In FIG. 4, the protrusions have multiple planar surfaces, although they can be straight, rounded, notched, or any combination thereof. Liner 250 can be comprised of a soft thermo-plastic elastomer (TPE), rubber, neoprene, or other suitable material with similar flexible properties.

Results of Corner and Side Drop Studies

Figure 5:
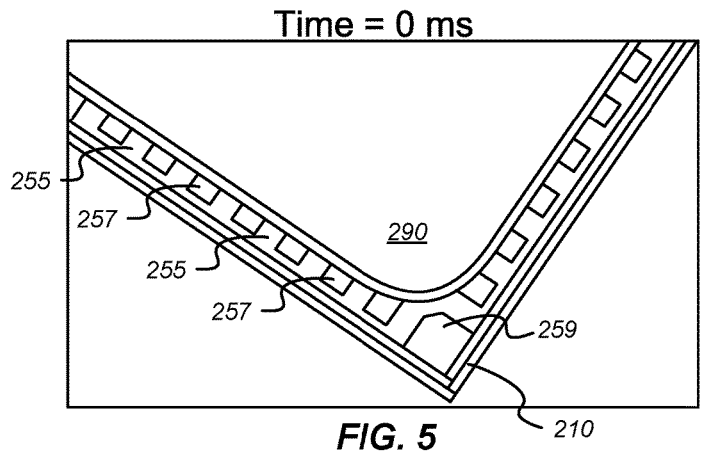
FIG. 5 is a simplified time-lapse illustration of a corner drop for a mobile display device in a protective cover during an impact event at time=0 ms, according to certain embodiments of the invention.

FIGS. 5-8 show a time-lapsed illustration of a corner drop for a mobile display device 260 in a protective cover during an impact event at time=0 ms, 1.76 ms, and 4.2 ms when dropped from a height of 1.8 m, according to certain embodiments of the invention. The protective cover includes housing 210, liner 250 which includes protrusions 255, voids 257, and corner void 259. In this particular embodiment, the liner 250 is constructed to be normal to the inner portion of the housing. Liner 250 may be normal to the entire side of the housing 210 and normal to most of the sides of the mobile display device 260. Portions of the liner 250 disposed at the very corner of the housing 210 may not be normal to the respective corner of the mobile display device 260. In embodiments, the backplane (not shown) is comprised of a stiff 2 mm polycarbonate, although other materials and dimensions can be applied. The housing is 1 mm thick stiff polycarbonate. Liner 250 can be comprised of a thermo-plastic elastomer, rubber, neoprene, or other suitable material. In this case, the voids 257 and protrusions 255 are of equal volume, as shown in FIG. 5, although other dimensions can be used (e.g., 40% protrusion to 60% voids).

As discussed above, impact force can be affected by the size of the impact site. That is, an impact that is distributed over a large surface area would yield a smaller impact force per square cm at the site of impact. Conversely, an impact distributed over a small area would yield a much larger impact force per square cm at the site of impact. In this case, a corner drop is shown and represents a worst case condition, i.e., an impact force distributed over a very small area comprising the corner of the protective cover.

As mentioned above, impact force can be mitigated by reducing the negative acceleration (i.e., deceleration) of the mobile device at impact. This can be affected in a number of ways. In some embodiments, a backplane is used to bypass the impact force (load) away from the mobile device, as discussed above. In FIGS. 5-8, square corners are used in housing 210 to maximize the stopping distance in corner drops. In rectangular housings, square corners can maximize the distance between the edge of the mobile device and the point of impact, thereby allowing more space for the liner to collapse as it is loaded by the mobile device. In FIG. 5, the corner impact is shown at time=0 ms. Mobile device 260 is uniformly contacting the protrusions 255 at each point along liner 250 as it would in a rest state and no deformations have occurred yet.

Figures 6, 7:
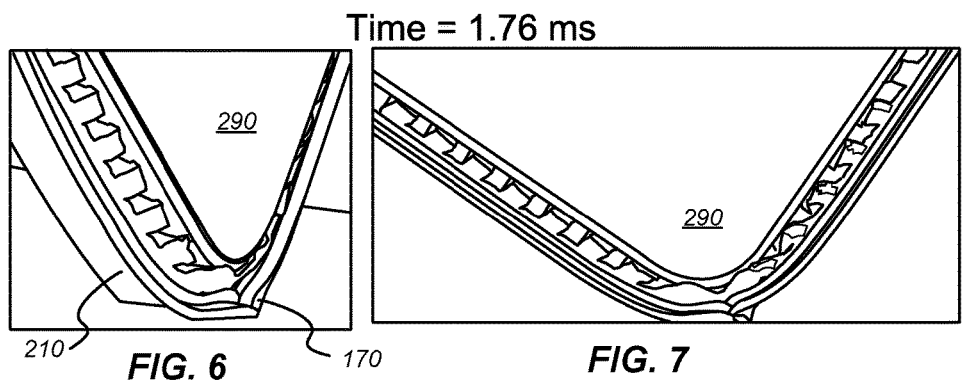
FIG. 6 is a simplified time-lapse illustration of a corner drop for a mobile display device in a protective cover during an impact event at time=1.76 ms, according to certain embodiments of the invention.
FIG. 7 is a simplified time-lapse illustration of a corner drop for a mobile display device in a protective cover during an impact event at time=1.76 ms, according to certain embodiments of the invention.

FIGS. 6-7 illustrate the corner drop at time=1.76 ms where the maximum force and deceleration is applied to the protective cover. Mobile device 260 has moved downward toward the point of impact due to inertia thereby deforming the liner and housing. The protrusions of liner 250 are loaded until they flow into the corner void 259 as mobile device 260 continues its travel downward.

Figure 8:
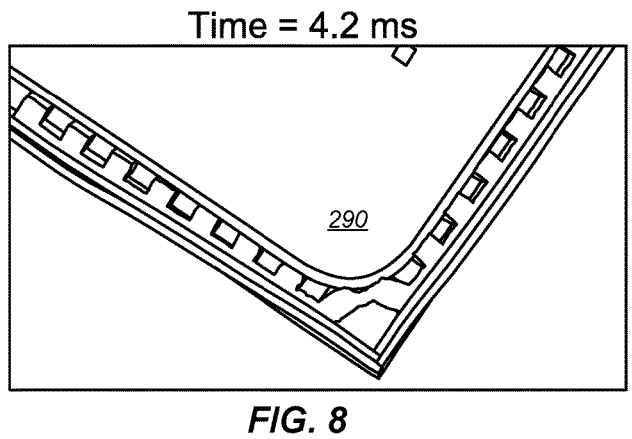
FIG. 8 is a simplified time-lapse illustration of a corner drop for a mobile display device in a protective cover during an impact event at time=4.2 ms, according to certain embodiments of the invention.

FIG. 8 illustrates the corner drop at time=4.2 ms where the mobile device has rebounded toward its initial position and the rate of deceleration is in decline. Note that the protrusions 255 are only marginally deformed and the corner void 259 has almost returned to its initial form. In this particular embodiment a backplane is used (though not expressly identified), however excellent deceleration properties can be achieved by the combination of the housing and liner alone. Thus, the combination of the rigid but flexible PC housing combined with the corrugated liner and collapsing action of the protrusions in the voids provide an excellent deceleration dampening effect to effectively reduce the maximum impact force imparted on the mobile device during an impact event. Some embodiments using these features (e.g., liner with corrugated pattern, backplane, etc.) exhibit a 74% reduction in acceleration for the mobile device.

Figure 9:
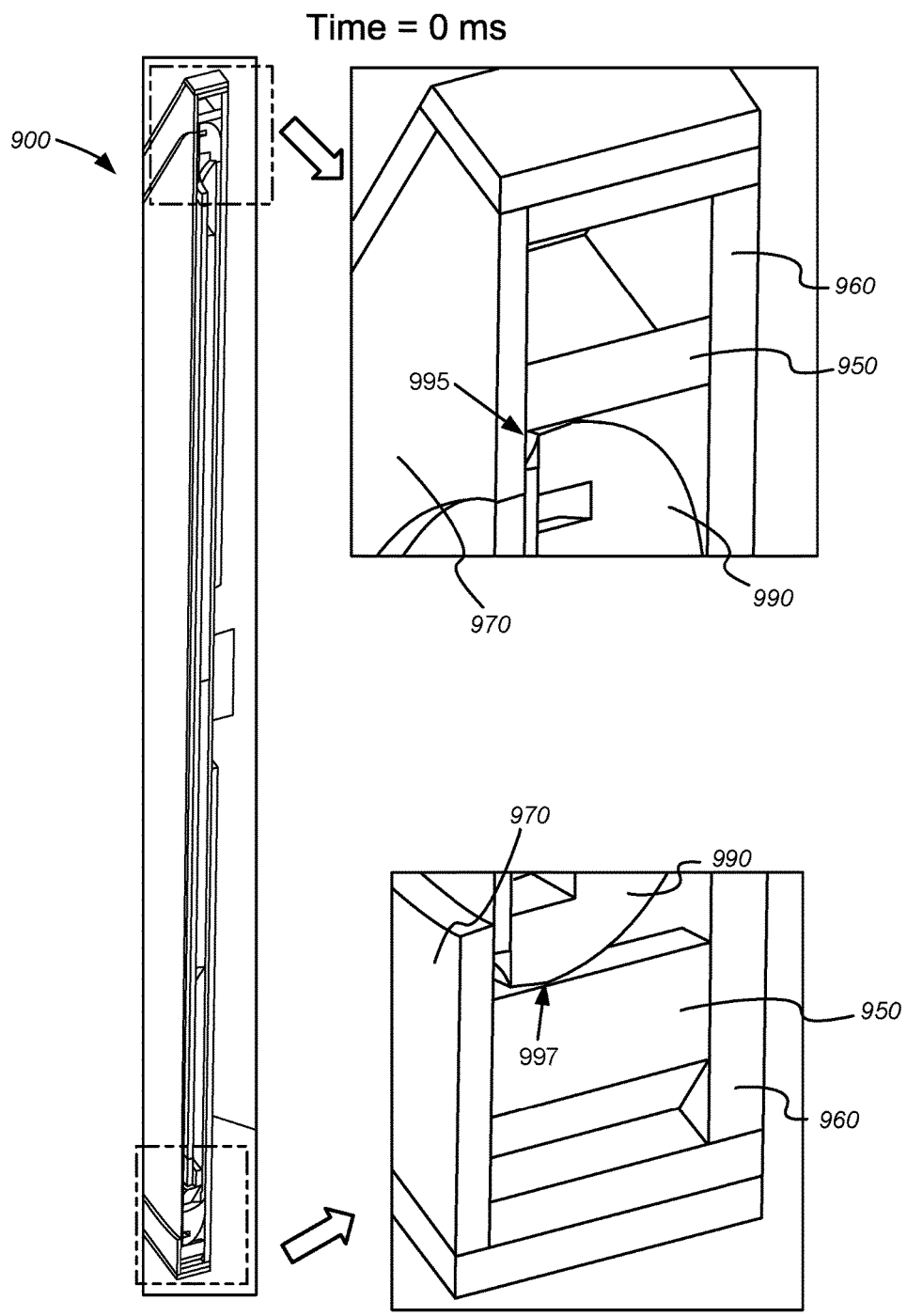
FIG. 9 is a simplified time-lapse illustration of a mobile display device in a protective cover during an impact event at time=0 ms, according to certain embodiments of the invention.
Figure 10:
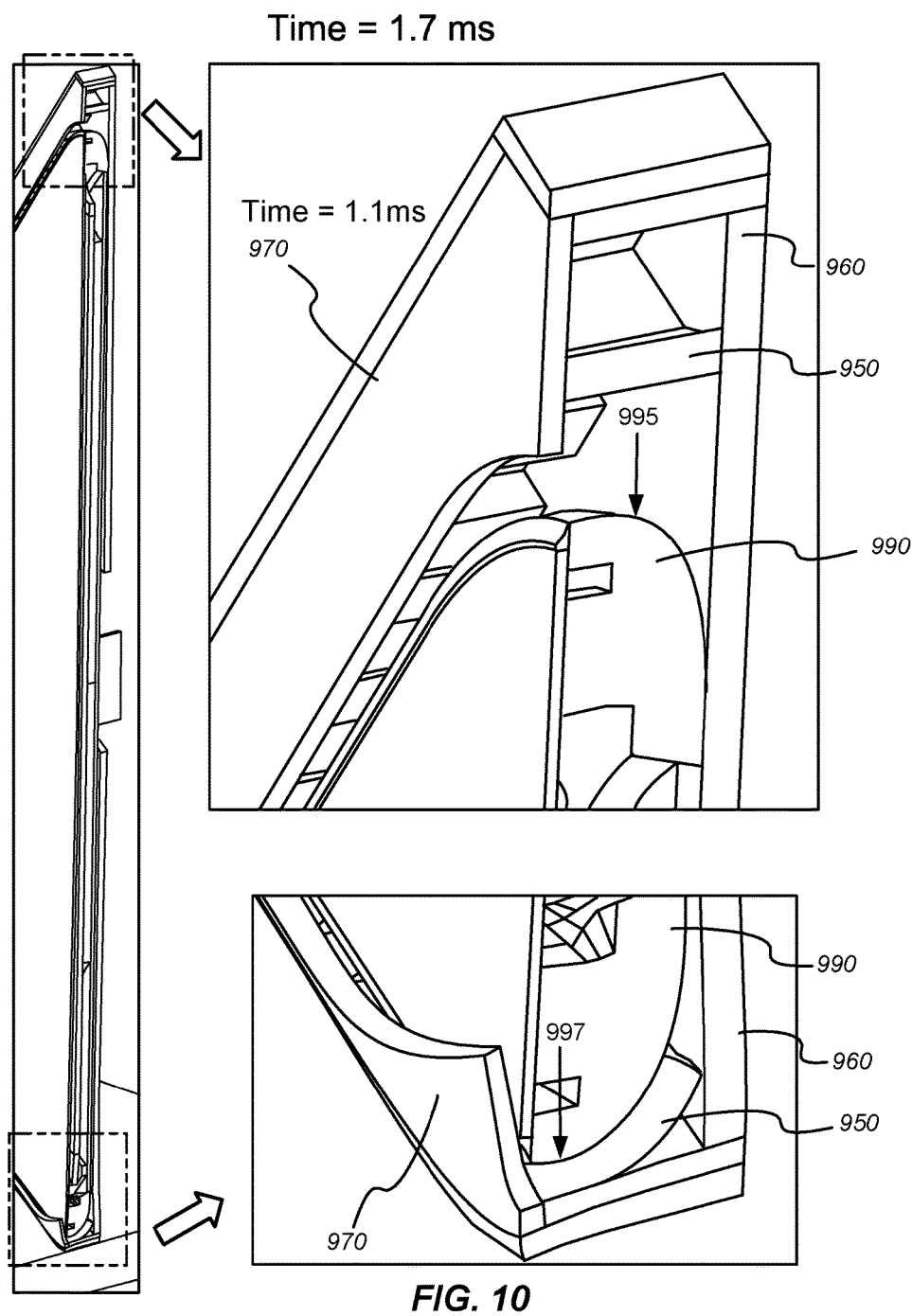
FIG. 10 is a simplified time-lapse illustration of a mobile display device in a protective cover during an impact event at time=1.7 ms, according to certain embodiments of the invention.
Figure 11:
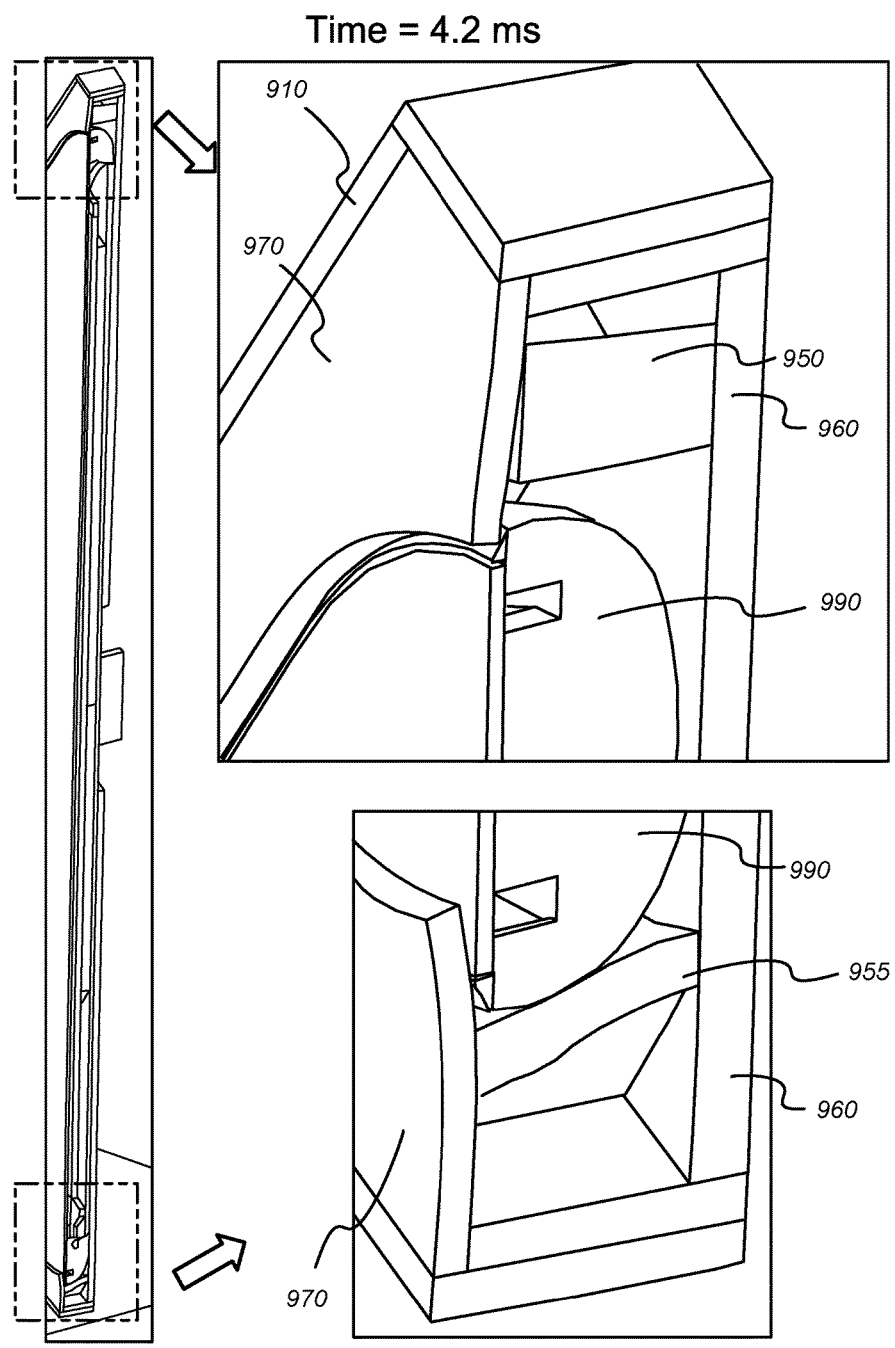
FIG. 11 is a simplified time-lapse illustration of a mobile display device in a protective cover during an impact event at time=4.2 ms, according to certain embodiments of the invention.

FIGS. 9-11 show a time-lapsed illustration of a side drop for a mobile display device 260 in a protective cover during an impact event at time=0 ms, 1.7 ms, and 4.2 ms, respectively, when dropped from a height of 1.8 m, according to certain embodiments of the invention. Each image shows a close up of the top and bottom edge to show the effects of the impact on both sides. The protective cover includes housing 910, liner 950 which includes protrusions and voids in a corrugated pattern, as discussed above. In this particular embodiment, the 960 is comprised of a stiff 2 mm polycarbonate, although other materials and dimensions can be applied. The housing is 1 mm thick stiff polycarbonate. Liner 250 can be comprised of a thermo-plastic elastomer, rubber, neoprene, or other suitable material. In FIG. 9, the corner impact is shown at time=0 ms. Mobile device 990 is uniformly contacting the protrusions at each point along liner 250 (see points 995, 997) as it would in a rest state and no deformations have occurred yet.

FIG. 10 illustrates the side drop at time=1.7 ms where the maximum force and deceleration is applied to the protective cover. Mobile device 260 has moved downward toward the point of impact due to inertia thereby deforming the liner and housing. The protrusions of liner 250 are loaded until they flow into the voids 257 as mobile device 260 continues its travel downward. On the bottom side, the mobile device travels a distance 997 towards the point of impact. On the top side, the amount of travel can be seen in distance 995 where the mobile device moved from a point of contact with the liner on the top side. Maximizing the amount of travel can reduce the maximum deceleration rate and ultimately lower the amount of impact force applied to the mobile device.

FIG. 11 illustrates the side drop at time=4.2 ms where the mobile device has rebounded toward its initial position and the rate of deceleration is in decline. Note that the protrusions 955 are only marginally deformed and the void 257 has almost returned to its initial form. In this particular embodiment a backplane 960 is used, however excellent deceleration properties can be achieved by the combination of the housing and liner alone. Thus, the combination of the rigid but flexible PC housing combined with the corrugated liner and collapsing action of the protrusions in the voids provide an excellent deceleration dampening effect to effectively reduce the maximum impact force imparted on the mobile device during an impact event.

Figure 12:
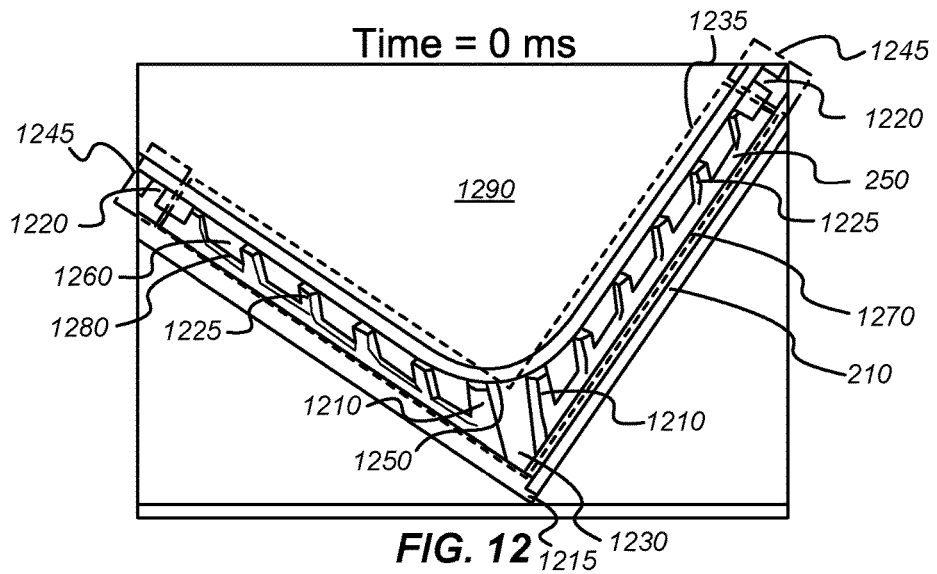
FIG. 12 is a simplified time-lapse illustration of a corner drop for a mobile display device in a protective cover having edge portions during an impact event at time=0 ms, according to certain embodiments of the invention.
Figure 13:
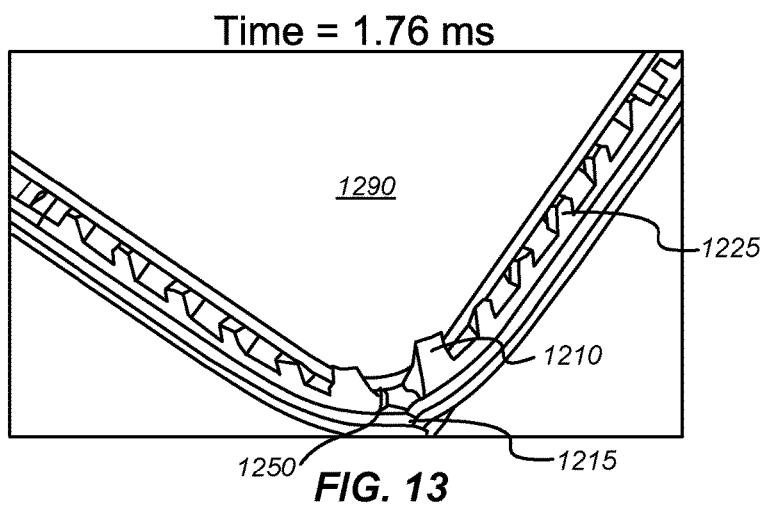
FIG. 13 is a simplified time-lapse illustration of a corner drop for a mobile display device in a protective cover having edge portions during an impact event at time=1.76 ms, according to certain embodiments of the invention.
Figure 14:
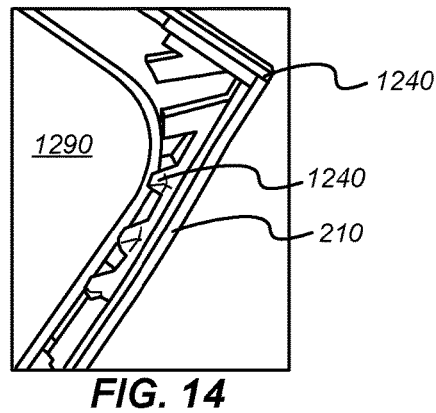
FIG. 14 is a simplified time-lapse illustration of a corner drop for an opposite corner of a mobile display device in a protective cover having edge portions during an impact event at time=1.76 ms, according to certain embodiments of the invention.

FIGS. 12-14 show a time-lapsed illustration of a corner drop for a mobile display device 1290 in a protective cover having angled edge protrusions during an impact event at time=0 ms and 1.76 ms when dropped from a height of 1.8 m, according to certain embodiments of the invention. The protective cover includes housing 210, liner 250 which includes protrusions 1220 and 1225, voids 1260, and corner gap 1230. In this particular embodiment, the liner 250 includes an edge portion 1245 and a corner portion 1235.

Edge portion 1245 may include edge protrusions 1220 that protrude in a direction normal to the inner portion of the housing 210. For instance, edge protrusions 1220 may extend 90 degrees from the inner portion of the housing 210. The edge portion 1245 may extend across a portion of a side 1270 of the housing 210. In embodiments, the edge portion 1245 extends along the side 1270 of the inner housing 210 between two corner portions. As an example, edge portion 1245 extend between bottom corner portion 1235 and a top corner portion (not shown).

Corner portion 1235 may include protrusion 1225 that protrude in a direction that is not normal to the inner portion of the housing 210. In certain embodiments, the protrusions 1225 extend in a direction that is at an angle of 45 degrees from the inner portion of the housing 210. Corner portion 1235 may be disposed at the corners of the protective cover, such as a bottom corner 1215, of the housing 210. Protrusions 1225 may be angled away from the corner 1215. In embodiments, corner portion 1235 may extend along a portion of the side 1270 of the inner portion of the housing 210. For instance, corner portion 1235 may extend between 0.5 to 2 inches along a side of the housing 210 from the bottom corner 1215. In certain embodiments, corner portion 1235 extends approximately one inch from the corner 1215. Although FIG. 13 illustrates the protective cover according to the bottom corner 1215, the description of FIG. 13 may apply to any corner of the protective cover, as each corner is substantially similar to the bottom corner 1215.

In embodiments, corner protrusions 1210 are located at a center of the corner portion 1235. The center of the corner portion 1235 may coincide with the corner 1215 of the housing 205. Corner protrusions 1210 may be positioned immediately adjacent to the corner gap 1230. In some embodiments, the corner protrusions 1210 are not normal to side 1270 of the housing 210, but are normal to a respective corner of the mobile display device 1290. For example, the corner protrusions 1210 may protrude at a 45 degree angle from the side 1270 of the housing 210, but make contact with a respective corner of the mobile display device 1290 at a 90 degree angle. In such embodiments, the corner protrusions 1210 may be positioned along a corner impact compression path, and may thus more efficiently decrease the deceleration of the corner impact. Positioning the corner protrusions 1210 normal to the corner of the mobile display device 1290 better protects the corners during impact.

FIG. 13 illustrates the corner drop at time=1.17 ms where the maximum force and deceleration is applied to the protective cover at the bottom corner 1215. Mobile display device 1290 moves downward toward the point of impact due to inertia, thereby deforming the liner and housing. The corner protrusions 1210 and protrusions 1225 of the corner portion 1235 may be loaded such that they flow into the voids 1260 as the mobile display device 1290 continues traveling downward. Positioning the corner protrusions 1210 normal to the bottom corner of the mobile display device 1290 more effectively decreases deceleration during the corner impact. Nominal force is lost from lateral slippage of the corner protrusions 1210. Thus, forces generated during the corner impact travel along the corner protrusions 1210 and are directly mitigated by a collapse of the protrusions 1210.

At a top corner 1240 illustrated in FIG. 14, respective corner portions disposed at the top corner 1240 collapse due from the inertia created during impact. Additionally, the housing 210 near the top corner may flex from impact, further decreasing the deceleration of the mobile display device 1290.

Figure 15:
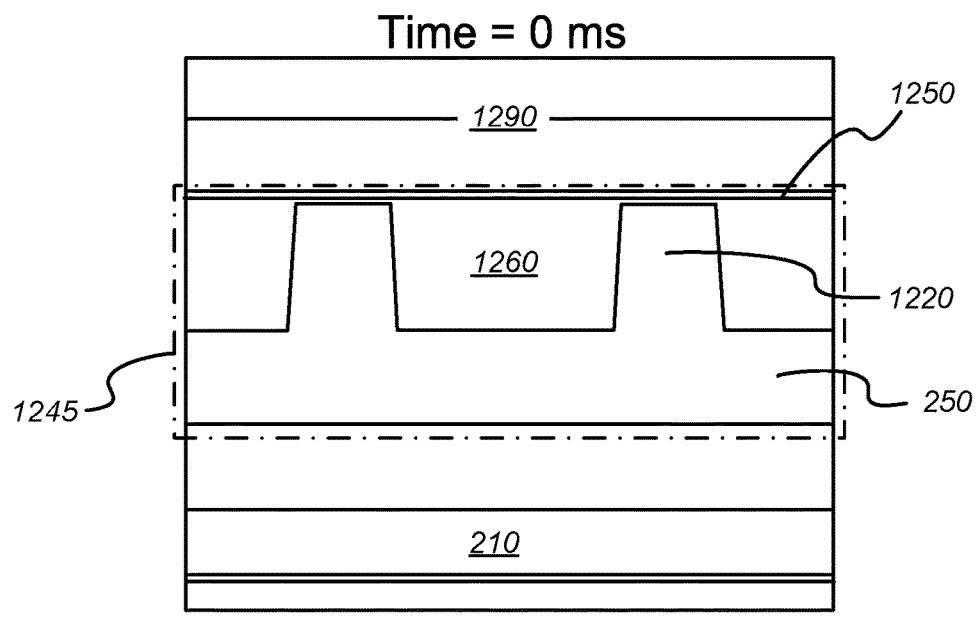
FIG. 15 is a simplified top-down time-lapse illustration of a side drop for a mobile display device in a protective cover during an impact event at time=0 ms, according to certain embodiments of the invention.
Figure 16:
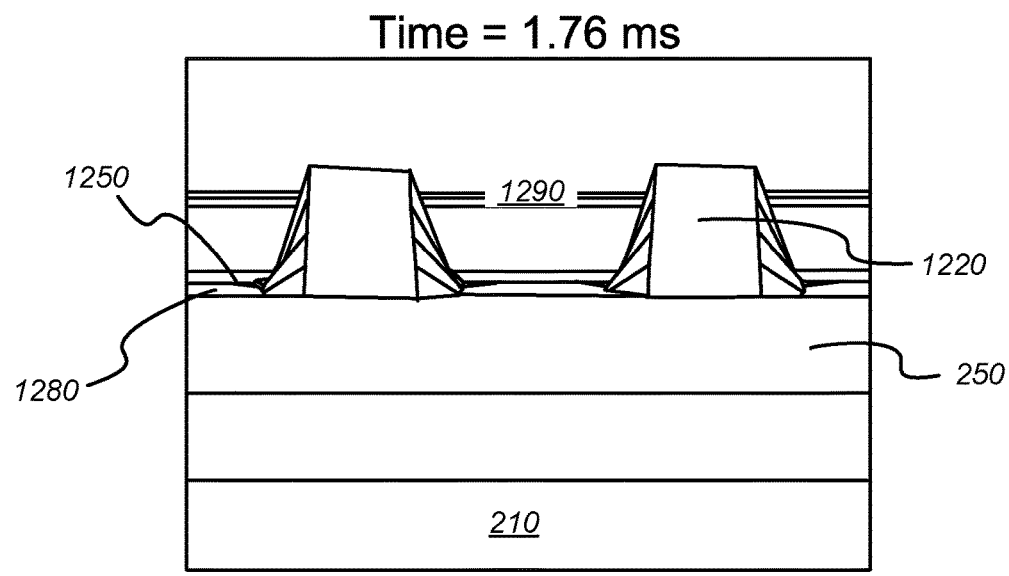
FIG. 16 is a simplified top-down time-lapse illustration of a side drop for a mobile display device in a protective cover during an impact event at time=1.76 ms, according to certain embodiments of the invention.

FIGS. 15-16 show a time-lapsed illustration of a side drop for a mobile display device 1290 in a protective cover having edge portions 1245. The edge portions 1245 include a liner 250 having edge protrusions 1220. The perspective shown in FIGS. 15-16 illustrate a portion of the protective cover, and one skilled in the art understands that the edge portions 1245 may include more than two protrusions 1220.

In embodiments, at time=0.0, i.e., before impact, the edge protrusions 1220 contact an edge 1250 of the mobile display device 1290. The edge 1250 may be any side edge of the mobile display device 1290, such as the top, bottom, left or right edge of the mobile display device 1290. At the contact point, edge protrusions 1220 may be positioned normal to the edge 1250. For instance, the edge protrusions 1220 may be disposed at an angle of 90 degrees from the edge 1250 of the mobile display device 1290. Thus, if impact occurs at the edge of the protective case, the edge protrusions 1220 may collapse to protect the mobile display device 1290 as shown in FIG. 16.

FIG. 16 illustrates the side drop at time=1.7 ms where the maximum force and deceleration is applied to the protective cover. Mobile display device 1290 has moved downward toward the point of impact due to inertia generated from the impact, thereby deforming the liner and housing. The edge protrusions 1220 of liner 250 load and flow into the voids 1260 (see FIG. 15) as mobile display device 1290 travels downward. Positioning the edge protrusions 1220 normal to the side 1250 of the mobile display device 1290 more effectively decreases deceleration during the side impact. Forces generated during the edge impact travel along the edge protrusions 1220 and are directly mitigated by the collapse of the protrusions 1220. In embodiments, the side 1250 of the mobile display device 1290 may collapse the edge protrusions 1220 to a point where the side 1250 makes contact with the liner 250. In such cases, the liner 250 may also collapse to reduce deceleration, thereby minimizing damage.

Figure 17A:
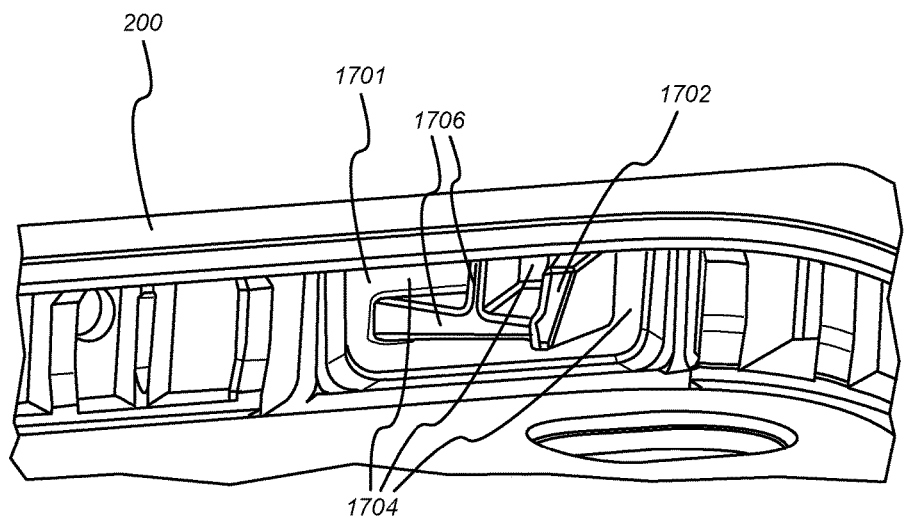
FIG. 17A is a simplified illustration of a single button for a protective cover, according to certain embodiments of the invention.
Figure 17B:
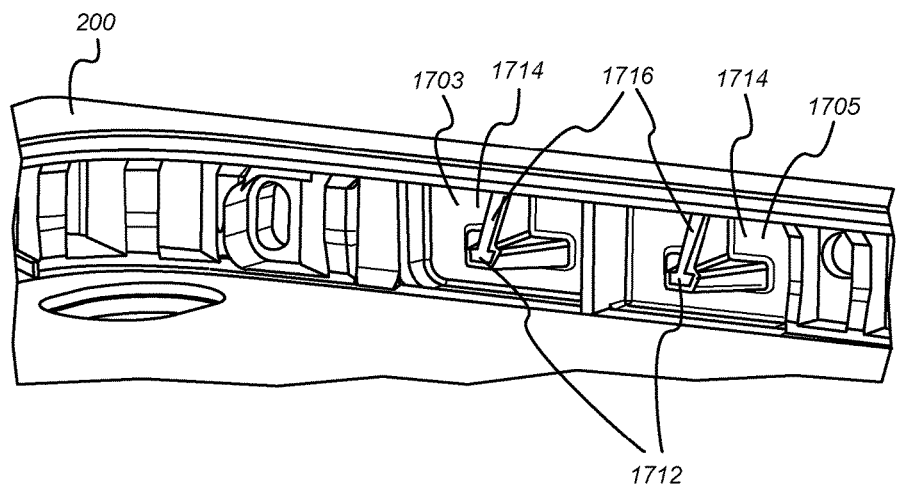
FIG. 17B is a simplified illustration of more than one adjacent button for a protective cover, according to certain embodiments of the invention.

In embodiments, portions of the inner protective cover may be different in areas where buttons are located. FIGS. 17A and 17B illustrate such portions of the inner protective cover. Specifically, FIG. 17A illustrates a portion of the inner protective cover where a single button may be located, and FIG. 17B illustrates a portion of the inner protective cover where more than one buttons may be located adjacent one another.

As shown in FIG. 17A, a single button 1701 is located on the protective cover 200. Button 1701 may correspond to a button on a mobile display device such that when the button 1701 is depressed, the corresponding button on the mobile display device is consequently depressed. In order for button 1701 to depress the corresponding button on the mobile display device, a button actuator 1702 may protrude on the inside of the button 1701. Button actuator 1702 may protrude far enough to make contact and depress the corresponding button on the mobile display device when button 1701 is depressed. In embodiments, supporting ribs 1706 may be disposed on regions of the inner button 1701 as well. Supporting ribs 1706 may perform functions similar to the liner 250 in other regions of the inner protective cover. That is, supporting ribs 1706 may load and flow into voids 1704 when compressed, such as during a side drop, to protect the button on the mobile display device.

Similar to the single button 1701, adjacent buttons 1703 and 1705 may be disposed on regions of the protective cover 200 as shown in FIG. 17B. Adjacent buttons 1703 and 1705 may be buttons typically found next to one another such as volume buttons on a mobile display device. In embodiments, buttons 1703 and 1705 may both have button actuators 1712 protruding from an inner portion of buttons 1703 and 1705. In certain embodiments, button actuators 1712 may be located at an end of supporting ribs 1716. Supporting ribs 1716 may load and flow into voids 1714 when compressed, such as during a side drop as shown in FIGS. 18 and 19.

Figure 18:
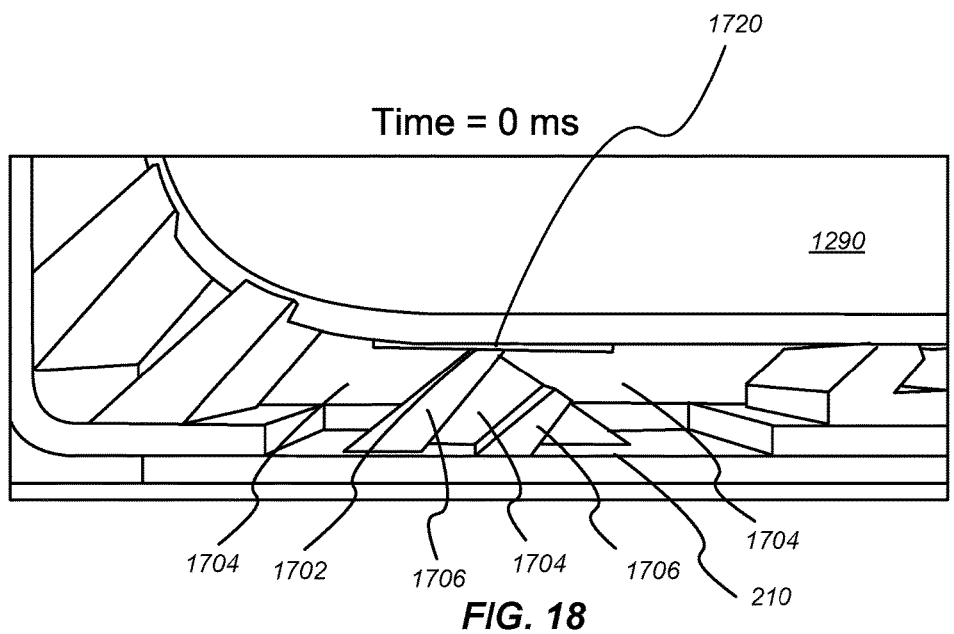
FIG. 18 is a simplified time-lapse illustration of a side drop at a button for a mobile display device in a protective cover during an impact event at time=0 ms, according to certain embodiments of the invention.
Figure 19:
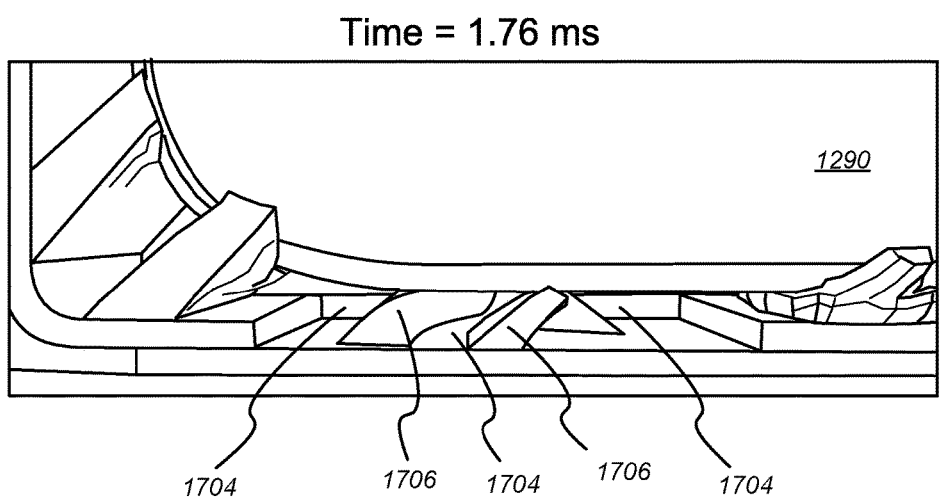
FIG. 19 is a simplified time-lapse illustration of a side drop at a button for a mobile display device in a protective cover during an impact event at time=1.76 ms, according to certain embodiments of the invention.

FIGS. 18-19 show a time-lapsed illustration of a side drop for a mobile display device 1290 in a protective cover where a button is located. At this location, the protective cover may include a button actuator 1702 and supporting ribs 1706 as discussed herein with respect to FIGS. 17A and 17B.

In embodiments, at time=0.0, i.e., before impact, button actuator 1702 may contact a button 1720 of the mobile display device 1290, as shown in FIG. 18. The button 1720 may be any button located at a corner or an edge of the mobile display device 1290. As shown in FIG. 18, button 1720 is located near a corner of the protective cover. Accordingly, the supporting ribs 1706 may be similar to protrusions at corners of the protective cover. For instance, at the contact point, supporting ribs 1706 may be protrude in a direction that is not normal to the inner portion of the housing 210. In certain embodiments, the supporting ribs 1706 extend in a direction that is at an angle of 45 degrees from the inner portion of the housing 210. Supporting ribs 1706 may be angled away from the corner 1215.

Although not illustrated in FIGS. 18 and 19, if button 1720 was located at an edge of the protective cover, then supporting ribs 1706 may be similar to protrusions at edges of the protective cover. For instance, at the contact point, supporting ribs 1706 may protrude normal to the button 1720. For instance, the supporting ribs 1706 may be disposed at an angle of 90 degrees from the button 1720 of the mobile display device 1290. Thus, if impact occurs at the edge of the protective case, the edge protrusions 1220 may collapse to protect the mobile display device 1290. If impact occurs at the edge or corner of the protective case, the supporting ribs 1706 may deform to protect the mobile display device 1290, as shown in FIG. 19.

FIG. 19 illustrates the side drop at time=1.76 ms where the maximum force and deceleration is applied to the protective cover. Mobile display device 1290 has moved downward toward the point of impact due to inertia generated from the impact, thereby deforming the supporting ribs 1706. Supporting ribs 1706 may load and flow into voids 1704 surrounding the supporting ribs 1706 as mobile display device 1290 travels downward. Thus, supporting ribs 1706 may effectively decrease deceleration during the side impact, thereby protecting button 1720 and minimizing damage.

Figure 20:
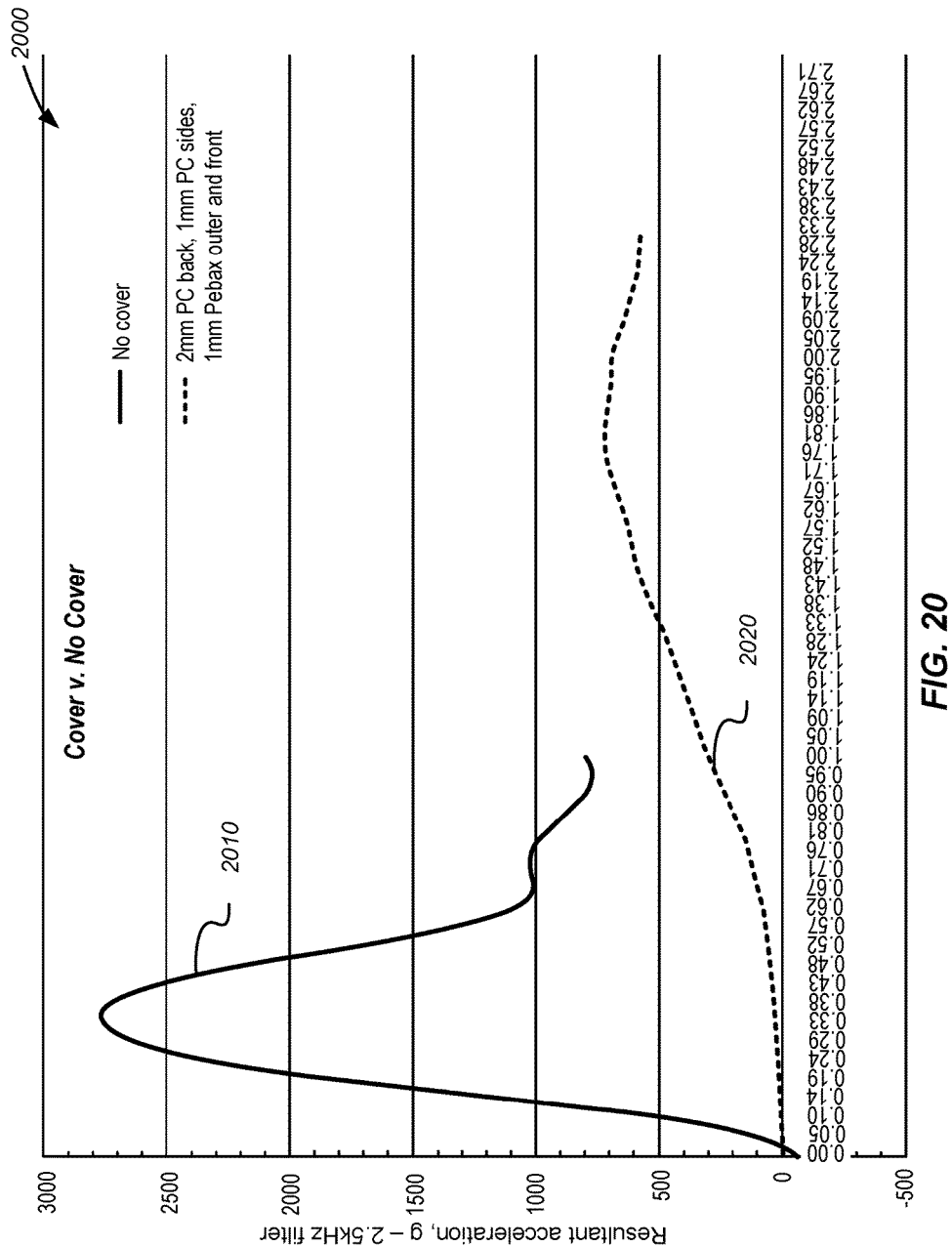
FIG. 20 is a graph comparing a deceleration rate for a mobile display device with and without a protective cover, according to certain embodiments of the invention.

FIG. 20 is a graph comparing a deceleration rate versus time for a mobile display device with and without a protective cover in a side impact event from a 1.8 m drop, according to certain embodiments of the invention. Line 2010 illustrates the acceleration of mobile display device 1290 upon impact with no cover. Line 2020 illustrates the acceleration of mobile display device 1290 upon impact with a protective cover 200.

In a side drop with no cover, a large deceleration spike peaks at about 2600 at 0.33 ms. This reflects a very high acceleration and accompanying impact force applied to the mobile device, likely resulting in breakage. In contrast, the mobile device with protective cover 200 peaks at about 750 at about 1.76 ms. This reflects a much lower acceleration (roughly 25% of the acceleration) over a longer period of time (roughly 5 times the time to reach the peak acceleration), thereby significantly reducing the likelihood of damage to the mobile device.

Corner Extensions

Keeping the mobile device in the protective cover during impact is crucial to preventing damage to the mobile device. In embodiments, slight structural modifications are incorporated into the design of the protective case to minimize detachment of the mobile device during impact. For instance, corner extensions may be incorporated to prevent detachment of the mobile device during impact, as further discussed herein.

Figure 21:
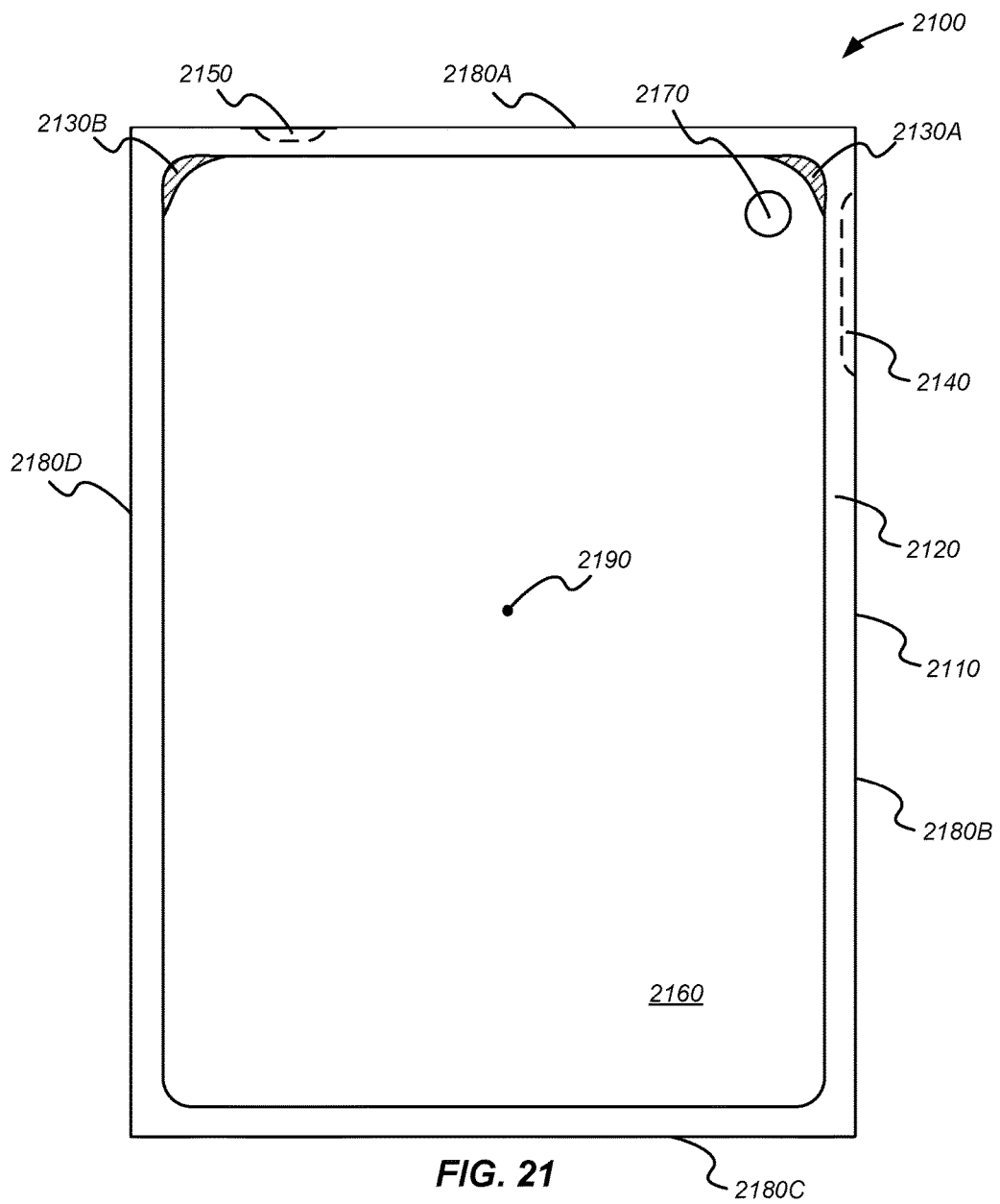
FIG. 21 is a simplified illustration of a protective cover having extended portions at a top two corners, according to certain embodiments of the invention

FIG. 21 illustrates a protective cover 2100 according to embodiments of the present invention. The protective cover 2100 has edges 2180A-D, and includes a housing 2110 configured to house a mobile display device. Housing 2110 has an outer portion and an inner portion. A backplane 2160 is coupled to a back side of housing 2120. A camera opening 2170 through which a camera may capture images may be disposed in the backplane 2160. In embodiments, a lip 2120 is coupled to a front side of housing 2110. A liner (not shown because hidden behind the lip 2120, but thoroughly described herein with respect to FIGS. 5-16) may be coupled to the inner portion of the housing 2110.

In embodiments, the lip 2120 extends away from nearby edges 2180 of the housing 2110 toward a center 2190 of the backplane 2160. Lip 2120 may be substantially parallel to the backplane 2160. When a mobile device is installed in the protective cover 2100, lip 2120 helps prevent the mobile device from detaching from the housing 2110. Accordingly, the lip 2120 may extend over a portion of the mobile device when the mobile device is installed in the protective cover 800.

When the mobile device and protective cover 2100 impact a solid surface, the protective cover 2100 may deform from inertia created during the impact, as already discussed herein. Deformation of the protective cover 2100 may cause the mobile device to inadvertently separate from the protective cover 2100. This may be because the lip 2120 does not extend far enough to keep the mobile device in place when the protective cover 2100 is deformed. Thus, according to embodiments of the present invention, portions of the lip 2120 may extend further away from nearby edges 2180 of the protective cover to prevent inadvertent separation during impact.

For instance, portions 2130 as shown in FIG. 21, may extend further away from nearby edges of the protective cover. Portions 2130 may be disposed at two adjacent corners of the protective cover 2100. For instance, portions 2130 may be disposed at the top two adjacent corners of the protective cover. Accordingly, portion 2130A may be disposed at edge 2135A and extend away from nearby edges 2180A and 2180B, and portion 2130B may be disposed at edge 2135B and extend away from nearby edges 2180A and 2180D. In embodiments, the portions 2130 are disposed at adjacent corners of the protective cover 2100 that are structurally weak. This is because weak corners may deform more during impact than structurally stronger corners. The top of the protective cover 2100 may be structurally weak due to various cutouts, such as the side cutout 2140, top cutout 2150, and camera hole 2170. Cutouts 2140 and 2150 may be through-holes within which a user may use to access regions of the mobile device. As an example, cutout 2140 may be a through-hole for the user to power on the device, insert headphones into the device, or flip a switch to activate the device in silent mode. Cutout 2150 may be a through-hole for the user to adjust the volume of the mobile device.

Although FIG. 21 illustrates two extended portions 2130A and 2130B, other embodiments can have more or less than two extended portions. For instance, the protective cover 2100 may have one or three extended portions. It is to be noted that having too few extended portions may not effectively prevent the mobile device from separating from the protective cover 2100. Further, having too many extended portions may make it difficult to install the mobile device into the protective cover 2100.

Having the extended portions 2130A and 2130B at adjacent corners of the protective cover may be advantageous in that it is easier for a mobile device to be installed. In such embodiments, one side of the mobile device may be inserted into a respective side of the protective cover 2100, such as the side having the extended portions. The opposite side of the mobile device may be easily pressed into the cover because of the lack of extended portions on that side. Although FIG. 21 illustrates the extended portions 2130 disposed at the corners of the protective cover, other embodiments can have extended portions at other regions of the protective cover 2100. As an example, extended portions may be disposed at the top and/or bottom sides of the protective cover 2100.

In embodiments, the extended portions 2130 may extend a certain distance away from the edge of the protective cover 2100 that is most suitable to prevent separation of the mobile device. Having an extended portion extend too far from the edge may block a portion of the display, or make the protective cover seem too bulky. Thus, the extended portion needs to be at a suitable distance to prevent separation of the mobile device without blocking the display or causing the protective cover to be excessively bulky. In embodiments, the extended portion may extend a distance that ranges between 20% to 30% greater than the other portions of the lip 2120. In particular embodiments, the extended portion may extend a distance that is approximately 25% greater than the other portions of the lip 2120. For instance, if other portions of the lip 2120 extend a distance of 2.1 mm from the inner portion of the housing 2110, then the extended portions may extend a distance of 2.5 mm from the inner portion of the housing 2110. Accordingly, the mobile device may be easily inserted into the protective cover 2110 and properly installed even during impact.

Figure 22:
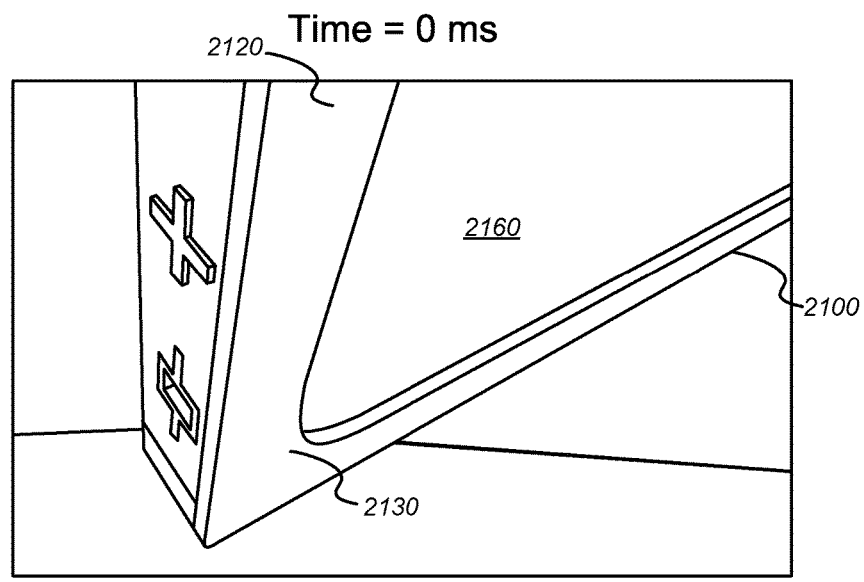
FIG. 22 is a simplified time-lapse illustration of an angle drop for a mobile display device in a protective cover having edge portions during an impact event at time=0 ms, according to certain embodiments of the invention.
Figure 23:
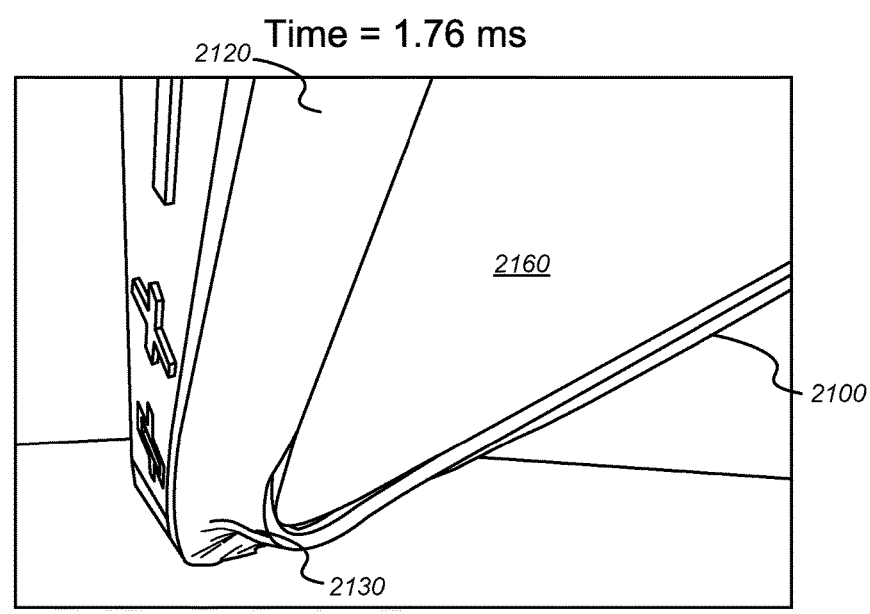
FIG. 23 is a simplified time-lapse illustration of an angle drop for a mobile display device in a protective cover having edge portions during an impact event at time=1.76 ms, according to certain embodiments of the invention.

FIGS. 22-23 show a time-lapsed illustration of an angle drop for a mobile display device 2160 in a protective cover 2100 having a lip 2120 with extended portions 2130. During impact of an angle drop, the mobile display device 2160 impacts a hard surface at a non-normal angle. For instance, a display plane of the mobile display device 2160 may be at an angle that is greater or less than 90 degrees to a ground surface. In embodiments, the display plane of the mobile display device 2160 may be at an angle of approximately 45 degrees to the ground surface.

In embodiments, at time=0.0, i.e., before impact, the mobile display device 2160 is contained within the protective cover 2100. The lip 2120 prevents separation of the mobile display device 2160 from the protective cover 2100. Extended portions 2130 may extend over additional regions of the mobile display device 2160 as discussed herein with respect to FIG. 22. If impact occurs at a non-normal angle, the lip 2120 and extended portions 2130 prevent the mobile display device 2160 from separating from the protective cover 2100 as shown in FIG. 23.

FIG. 23 illustrates the angle drop at time=1.7 ms where the maximum force and deceleration is applied to the protective cover 2100. Mobile display device 1290 has moved downward toward the point of impact due to inertia generated from the impact, thereby deforming the lip 2120. In some embodiments, the lip 2120 may deform but maintain containment of the mobile display device 2160. Extended portions 2130 help prevent separation of the mobile display device 2160 by covering more regions of the mobile display device 2160. The extended portions 2130 may deform less during impact and prevent the mobile display device 2160 from slipping out of the protective cover 2100, as shown in FIG. 23. Accordingly, the protective cover 2100 may protect the mobile display device 2160 from damage caused by impact.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. It should be noted that any recitation of "a", "an" or "the" is intended to mean "one or more" unless specifically indicated to the contrary.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A protective cover for a mobile display device comprising:
   a housing including:
      an outer portion having a generally rectangular frame structure configured to, when the protective cover is coupled to a mobile display device, provide a protective shell along an edge perimeter surrounding a display of the mobile display device; and
      an inner portion coupled to the outer portion and constructed of a deformable material,
         wherein the inner portion includes a successive pattern of protrusions separated by a distance that forms a gap between each of the protrusions, wherein each protrusion is configured to collapse into and fill the gap in response to the protective cover receiving an impact force on a corresponding location of the outer portion, and
   a backplane coupled to a backside of the housing and is configured to provide a protective shell along a back side of the mobile display device.

2. The protective cover of claim 1 wherein the backplane is a rigid material and operates to bypass and absorb at least a portion of an impact force on the housing.

3. The protective cover of claim 2 wherein the backplane is comprised of one of an aluminum or polycarbonate structure.

4. The protective cover of claim 1 wherein the outer portion of the housing has squared corners.

5. The protective cover of claim 1 wherein the inner portion is comprised of a soft thermo-plastic elastomer (TPE).

6. The protective cover of claim 1 wherein the inner portion comprises a liner protruding from the inner portion of the housing at a direction normal to the inner housing.

7. The protective cover of claim 1 wherein the inner portion includes an edge portion and a corner portion, wherein the edge portion protrudes from the inner portion of the housing at a different angle than the corner portion.

8. The protective cover of claim 7 wherein the edge portion protrudes at a 90 degree angle from the inner portion of the housing, and the corner portion protrudes at a 45 degree angle from the inner portion of the housing.

9. The protective cover of claim 7 wherein the edge portion extends at least one inch along adjacent edges of each corner.

10. The protective cover of claim 1 further comprising a lip coupled to a front side of the housing to retain the mobile display device within the housing.

11. The protective cover of claim 10 wherein the lip is comprised of a stiff TPE.

12. The protective cover of claim 1 wherein the housing is comprised of a stiff TPE.

13. The protective cover of claim 1 wherein the backplane is between 1 and 2 mm thick.

14. The protective cover of claim 1 wherein the housing is 1 mm thick.

15. The protective cover of claim 1 wherein the distance between the inner portion protrusions is substantially equal to the width of the inner portion protrusions.

16. An apparatus comprising:
a rectangular housing including:
an outer portion having a generally rectangular frame structure configured to, when the apparatus is coupled to a mobile display device, provide a protective shell along an edge perimeter surrounding a display of the mobile display device; and
an inner portion coupled to the outer portion and constructed of a deformable material,
wherein the inner portion includes a successive pattern of protrusions separated by a distance that forms a gap between each of the protrusions, wherein each protrusion is configured to collapse into and fill the gap in response to the protective cover receiving an impact force on a corresponding location of the outer portion, and
a backplane coupled to a backside of the housing, wherein the backside and housing are configured to retain the mobile display device within the housing.

17. The protective cover of claim 16 further comprising a lip coupled to a front side of the housing.

18. The protective cover of claim 16 wherein the backplane is a rigid material and operates to bypass and absorb an impact force directed to the housing.

19. The protective cover of claim 16 wherein the distance between the protrusions is substantially equal to the width of the protrusions.

20. An apparatus comprising:
a generally rectangular housing configured to receive a mobile display device, the housing including:
an outer portion having a generally rectangular frame structure configured to, when the apparatus is coupled to the mobile display device, provide a protective shell along an edge perimeter surrounding a display of the mobile display device;
an inner portion coupled to the outer portion and constructed of a deformable material,
wherein the inner portion includes a successive pattern of protrusions separated by a distance that forms a gap between each of the protrusions, wherein each protrusion is configured to collapse into and fill the gap in response to the protective cover receiving an impact force on a corresponding location of the outer portion, and
a lip coupled to a front side of the housing and configured to retain the mobile display device within the housing; and
a backplane coupled to a backside of the housing, wherein the lip extends in a direction parallel to the backplane and away from an edge of the housing, and wherein two adjacent corners of the lip extend further away from the edge of the housing than other portions of the lip.

* * * * *